US011206887B1

(12) United States Patent
Templer

(10) Patent No.: US 11,206,887 B1
(45) Date of Patent: Dec. 28, 2021

(54) METHOD OF FORMING A RAISED THREE-DIMENSIONAL DECORATIVE IMAGE ON A FABRIC PRODUCT AND CAP MADE THEREBY

(71) Applicant: Elegant Headwear Co., Inc., Elizabeth, NJ (US)

(72) Inventor: Joseph Templer, Spring Valley, NY (US)

(73) Assignee: ELEGANT HEADWEAR CO., INC., Cranford, NJ (US)

( * ) Notice: Subject to any disclaimer, the term of this patent is extended or adjusted under 35 U.S.C. 154(b) by 0 days.

(21) Appl. No.: 15/596,367

(22) Filed: May 16, 2017

Related U.S. Application Data

(60) Provisional application No. 62/337,003, filed on May 16, 2016.

(51) Int. Cl.

| | | |
|---|---|---|
| *A42B 1/004* | (2021.01) | |
| *A42B 1/0182* | (2021.01) | |
| *A42B 1/02* | (2006.01) | |
| *A42C 1/08* | (2006.01) | |
| *D06Q 1/08* | (2006.01) | |
| *B29D 99/00* | (2010.01) | |
| *B29K 67/00* | (2006.01) | |

(Continued)

(52) U.S. Cl.
CPC ............ *A42B 1/004* (2013.01); *A42B 1/0182* (2021.01); *A42B 1/02* (2013.01); *A42C 1/08* (2013.01); *B29D 99/0064* (2013.01); *D06Q 1/08* (2013.01); *B29K 2067/00* (2013.01); *B29K 2105/04* (2013.01); *B29K 2105/256* (2013.01)

(58) Field of Classification Search
CPC ........... A42B 1/004; A42B 1/062; A42B 1/02; A42B 1/248; A42B 1/0182; A42B 1/0183; A42B 1/019; A42C 1/04; A42C 1/08; D06Q 1/08; A41D 27/08; D06P 5/004; D06P 5/003; D06P 5/02; D06P 7/00; B29D 99/0064; B29K 2105/256; B29K 2067/00; B29K 2105/04; B44C 1/24; B44C 3/085
USPC ........................................................ 2/195.1
See application file for complete search history.

(56) References Cited

U.S. PATENT DOCUMENTS 2,873,204 A * 2/1959 Hochuli ................... D06Q 1/08
264/132
3,730,814 A * 5/1973 Kuroda .................. B29C 66/21
156/515

(Continued)

FOREIGN PATENT DOCUMENTS

KR 20090007009 U * 7/2009

*Primary Examiner* — Amy Vanatta
(74) *Attorney, Agent, or Firm* — Galgano IP Law PLLC; Thomas M. Galgano

(57) ABSTRACT

A wearable article and, particularly, an article of headwear having a raised, three-dimensional decorative image and a method of forming the wearable article having the raised, three-dimensional decorative image. The article of headwear having at least one fabric panel with a non-embroidered, ornamental image. At least a portion of the fabric panel with the ornamental image is embossed in relief, to define an embossed portion of the fabric panel with the first surface of the embossed portion of the fabric panel having a raised profile and contour above a remaining portion of the first surface of the fabric panel, to define a three-dimensional effect to at least a portion of the ornamental image on the fabric panel.

3 Claims, 5 Drawing Sheets

(51) Int. Cl.
*B29K 105/00* (2006.01)
*B29K 105/04* (2006.01)

(56) References Cited

U.S. PATENT DOCUMENTS

| | | | | |
|---|---|---|---|---|
| 3,756,888 A | * | 9/1973 | Kuroda | B29C 65/04 156/220 |
| 3,758,358 A | * | 9/1973 | Kuroda | B29C 66/1122 156/222 |
| 3,868,214 A | | 2/1975 | Shackleton | |
| 3,868,288 A | * | 2/1975 | Ercolano | B29C 51/00 156/248 |
| 4,100,010 A | | 7/1978 | Waugh | |
| 4,223,057 A | | 9/1980 | Rejto | |
| 4,356,617 A | | 11/1982 | Coscia | |
| 4,386,123 A | | 5/1983 | Coburn, Jr. | |
| 4,409,280 A | * | 10/1983 | Wiley | B32B 5/24 428/203 |
| 4,585,684 A | * | 4/1986 | Mackarous | A44C 3/001 156/213 |
| 4,589,884 A | * | 5/1986 | Gilpatrick | D06B 11/0093 8/115 |
| 4,591,521 A | * | 5/1986 | Freno | B44F 7/00 2/80 |
| 4,772,503 A | * | 9/1988 | Donsky | A41D 27/08 2/115 |
| 5,344,358 A | | 9/1994 | Jantzen | |
| 5,729,834 A | * | 3/1998 | Sloot | A41D 27/08 156/276 |
| 5,933,867 A | | 8/1999 | Corder | |
| 6,066,224 A | * | 5/2000 | Santucci | D06P 5/001 156/220 |
| 6,139,928 A | * | 10/2000 | Sloot | B32B 3/28 428/7 |
| 6,158,055 A | * | 12/2000 | Park | A42B 1/06 112/439 |
| 6,270,877 B1 | * | 8/2001 | Sloot | D06Q 1/00 24/1 |
| 6,305,028 B1 | | 10/2001 | Lin | |
| D453,261 S | * | 2/2002 | Pisarevsky | A42B 1/248 D2/866 |
| 7,153,561 B2 | | 12/2006 | Larson et al. | |
| 7,229,680 B1 | | 6/2007 | Crompton | |
| 2003/0084499 A1 | * | 5/2003 | Park | A42B 1/062 2/195.6 |
| 2006/0143791 A1 | * | 7/2006 | Kronenberger | A42B 1/248 2/195.1 |
| 2006/0174397 A1 | * | 8/2006 | Taguchi | A42B 1/0182 2/195.6 |
| 2006/0277658 A1 | | 12/2006 | Marsh et al. | |
| 2010/0199406 A1 | * | 8/2010 | Dua | A43B 1/04 2/115 |
| 2013/0316607 A1 | | 11/2013 | Ichikawa et al. | |
| 2015/0014901 A1 | | 1/2015 | Ou | |
| 2015/0306839 A1 | * | 10/2015 | Beliveau | A41D 31/065 428/195.1 |
| 2016/0000160 A1 | * | 1/2016 | Kronenberger | A42B 1/248 428/131 |
| 2016/0076197 A1 | * | 3/2016 | Caldwell | D06Q 1/005 428/172 |
| 2018/0266028 A1 | * | 9/2018 | Hwang | A42B 1/004 |

* cited by examiner

METHOD OF FORMING A RAISED THREE-DIMENSIONAL DECORATIVE IMAGE ON A FABRIC PRODUCT AND CAP MADE THEREBY

CROSS-REFERENCE TO RELATED APPLICATION

This application claims benefit from U.S. Provisional Patent Application Ser. No. 62/337,003, filed May 16, 2016, the contents of which are hereby incorporated by reference.

BACKGROUND OF THE INVENTION

1. Field of the Invention

The invention is generally in the field of wearable fabric products and, in particular, clothing and accessories including specifically, hats and caps. Particularly, the present invention is directed to a method of forming a raised, three-dimensional decorative image in relief on a wearable fabric product and specifically, on a hat or cap, and a hat or cap made thereby.

2. Brief Description of the Prior Art

Various styles of caps and hats are well known as well as certain hats having decorative objects and indicia on the cap. It is also known to print, embroider, or attach various indicia on or to a wearable fabric product. However, it is desirable to have a fashion or novelty hat or cap having a raised, three-dimensional decorative image formed in relief and which creates a three-dimensional effect to an ornamental image printed on the cap. It is known to emboss fabrics with a repetitive pattern using rollers, but such methods are not suitable to emboss a precise portion of a fabric, so that the embossed portion is superimposed over an image printed onto the fabric.

While the prior art discloses many types of hats and caps, so far as is known, none of these assemblies provide for the novel hats or caps with a raised, three-dimensional decorative image formed in relief, as in the present invention, or a method of making the same.

SUMMARY OF THE INVENTION

Accordingly, it is an object of the present invention to provide a method of forming a raised, three-dimensional decorative image in relief on a wearable fabric product.

It is also an object of the present invention to provide a novel method of forming a raised, three-dimensional decorative image in relief on a hat or cap.

Additionally, it is an object of the present invention to provide a novel cap or hat having a raised, three-dimensional decorative image formed in relief thereon.

In addition, it is yet another object of the present invention to provide a wearable fabric product having a raised, three-dimensional decorative image formed in relief thereon.

It is another object of the present invention to provide a raised, three-dimensional decorative image formed in relief on a wearable fabric product, and particularly a hat or cap, which is in alignment with an ornamental image printed on the hat or cap, to create a three-dimensional effect to the ornamental image.

It is yet another object of the present invention to provide a raised, three-dimensional decorative image formed in relief on a fabric product having an upper profile with a height which varies.

Certain of the foregoing and related objects are readily attained according to the present invention through the provision of an article of headwear having a raised, three-dimensional decorative image, comprising an article of headwear comprising at least one fabric panel having a first surface; a non-embroidered, ornamental image on said first surface of said fabric panel; and at least a portion of said fabric panel with said ornamental image being embossed in relief, to define an embossed portion of said fabric panel and wherein said first surface of said embossed portion of said fabric panel has a raised profile and contour disposed above a remaining portion of said first surface of said fabric panel, to define a three-dimensional effect to at least a portion of said ornamental image on said fabric panel.

In the preferred embodiment, said article of headwear is a member selected from the group consisting of a hat and a cap. Preferably, said article of headwear comprises a baseball cap style hat comprising a dome-shaped crown removably receivable over the head of a wearer, said crown having a front portion, a rear portion, a lower edge defining a lower opening therebetween for the head of the wearer, an inside surface, an outside surface, and a bill attached to said front portion of said crown and extending outwardly from said lower edge of said front portion of said crown; and wherein said fabric panel is incorporated into said crown of said hat. More particularly, it is preferred that said fabric panel is incorporated into said front portion of said crown of said hat.

Advantageously, said ornamental image is printed onto said first surface of said fabric panel. Desirably, said ornamental image is applied to said first surface of said fabric panel via dye sublimation. It is preferred that said ornamental image is a member selected from the group consisting of logos, shapes, and designs. Preferably, said embossed portion of said fabric panel comprises a plurality of spaced-apart embossed portions.

In a preferred embodiment, said embossed portion of said fabric panel has a uniform height above said remaining portion of said first surface of said fabric panel. Alternatively, in another embodiment, said embossed portion of said fabric panel has a height above said remaining portion of said first surface of said fabric panel, and said height of said embossed portion varies. It is desirable that said embossed portion of said fabric panel is in alignment with at least a portion of said ornamental image on said first surface of said fabric panel, to define a three-dimensional sculptured effect in relief, to at least a portion of said ornamental image on said fabric panel.

Certain of the foregoing and related objects are also readily attained according to the present invention through the provision of a method of forming a raised, three-dimensional decorative image on an article of headwear, comprising the steps of providing a first mold half comprising an upper surface having a raised surface portion that is sculptured in relief and has a contour and profile that corresponds to a contour and profile of said three-dimensional decorative image to be formed on said article of headwear; providing a second mold half; providing a fabric panel to be formed with said three-dimensional decorative image, said fabric panel having a first surface with a non-embroidered, ornamental image thereon; placing said fabric panel between said first mold half and said second mold half; bringing said first and second mold halves together, such that said upper surface of said first mold half contacts said second mold half, with said fabric panel disposed in between said first and second mold halves, to emboss in relief at least a portion of said fabric panel with said ornamental image, to define an embossed portion of said fabric panel, and wherein said first surface of said embossed portion of said fabric panel has a raised profile and contour disposed above a remaining portion of said first surface of said fabric panel, to define a three-dimensional effect to at least a portion of said ornamental image on said fabric panel; separating said first and second mold halves and removing said fabric panel from said first and second mold halves, with said embossed portion retained in said fabric panel; and forming said article of headwear with said fabric panel.

Preferably, said article of headwear is a member selected from the group consisting of a hat and a cap. More particularly, it is preferred that said article of headwear comprises a baseball cap style hat comprising a dome-shaped crown removably receivable over the head of a wearer, said crown having a front portion, a rear portion, a lower edge defining a lower opening therebetween for the head of the wearer, an inside surface, an outside surface, and a bill attached to said front portion of said crown and extending outwardly from said lower edge of said front portion of said crown; and wherein said fabric panel is incorporated into said crown of said hat. Additionally, it is desirable that said fabric panel is incorporated into said front portion of said crown of said hat.

Advantageously, said second mold half comprises a lower surface having an indented surface portion having a sculptured profile that corresponds to and is in alignment with said raised surface portion of said first mold half and wherein said fabric panel is placed between said upper surface of said first mold half and said lower surface of said second mold half and wherein when said first and second mold halves are brought together, said raised surface portion of said first mold half with said fabric panel overlying said first mold half is received within said indented surface portion of said second mold half.

Desirably, said fabric panel is imprinted with said ornamental image, prior to placing said fabric panel between said first and second mold halves. Preferably, said ornamental image is applied to said first surface of said fabric panel via dye sublimation, prior to placing said fabric panel between said first and second mold halves. It is also preferred that said ornamental image on said fabric panel is aligned with a corresponding portion of said raised surface portion of said first mold half prior to bringing said first and second mold halves together, such that said embossed portion defines a three-dimensional sculptured effect in relief, to at least a portion of said ornamental image on said fabric panel. It is preferable that the method further comprises the step of applying a member selected from the group consisting of pressure and heat when bringing said first and second mold halves together.

In addition, certain of the foregoing and related objects are readily attained according to the present invention through the provision of a wearable article having a raised, three-dimensional decorative image, comprising a wearable article comprising at least one fabric panel having a first surface; a non-embroidered, ornamental image on said first surface of said fabric panel; and at least a portion of said fabric panel with said ornamental image being embossed in relief, to define an embossed portion of said fabric panel and wherein said first surface of said embossed portion of said fabric panel has a raised profile and contour disposed above a remaining portion of said first surface of said fabric panel, to define a three-dimensional effect to at least a portion of said ornamental image on said fabric panel.

Other objects and features of the present invention will become apparent from the detailed description considered in connection with the accompanying drawings, which disclose several embodiments of the invention. It is to be understood that the drawings are to be used for the purpose of illustration only and not as a definition of the limits of the invention.

DETAILED DESCRIPTION OF THE PREFERRED EMBODIMENTS

Figure 1:
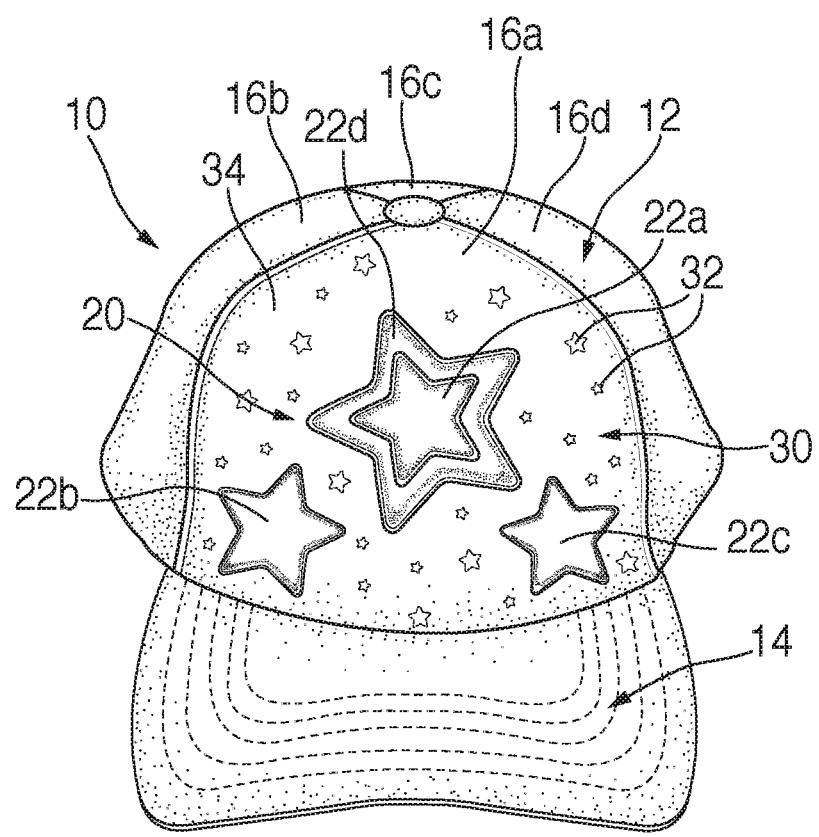
FIG. 1 is a front and top perspective view of a cap having a raised, three-dimensional decorative image formed over an ornamental image printed on the cap, according to the present invention.
Figure 2:
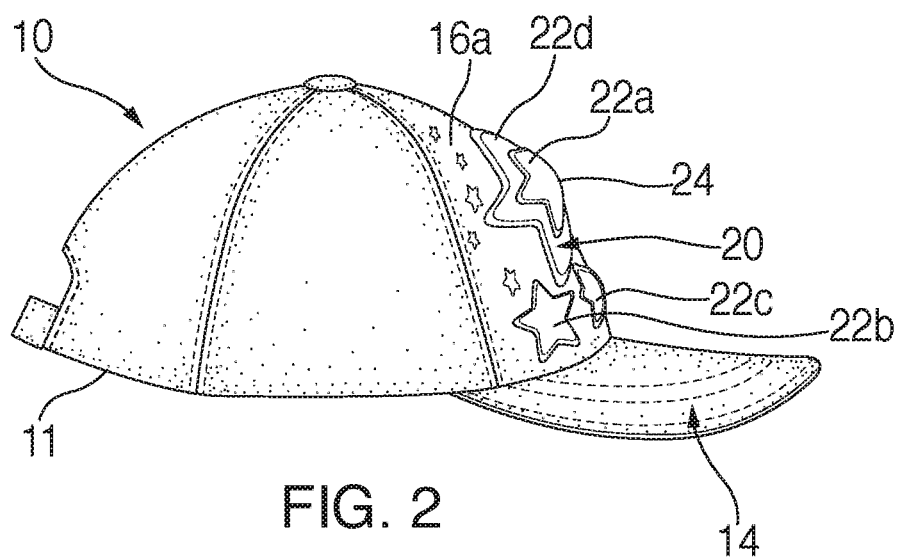
FIG. 2 is a left side elevation view of the cap of FIG. 1, showing the raised upper profile and contour of the raised, three-dimensional decorative image formed in alignment with the ornamental image printed on the cap.
Figure 3:
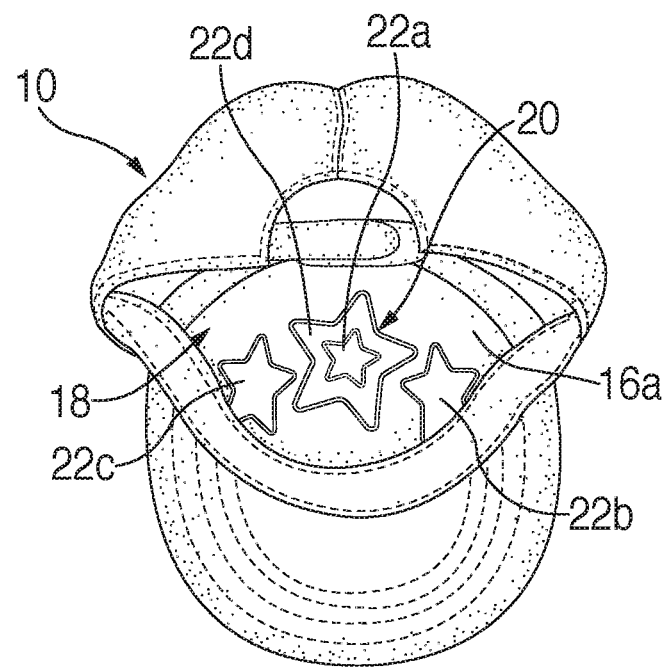
FIG. 3 is a bottom plan view of the cap of FIG. 1, showing the indented inside surface of the cap as a result of the raised, three-dimensional decorative image.

Turning now in detail to the drawings and, in particular, FIG. 1, which illustrates a wearable fabric product, specifically an article of headwear, namely, a baseball-style cap, generally designated by reference numeral 10. As seen in FIGS. 1-3, cap 10 has a raised, three-dimensional decorative image 20 formed in relief thereon which creates a three-dimensional effect to a portion of an ornamental image 30 printed onto the cap 10. While the present invention is shown in connection with a baseball-style cap 10, it can be appreciated that the raised, three-dimensional decorative image 20 may be formed in other fabric products including, for example, in other styles of headwear, such as, for example, other styles of hats, beanies, caps, visors, knit hats, other wearable articles, such as, for example, fabric clothing products or accessories, including, gloves, footwear, shirts, etc., or in other fabric accessories, such as, for example, umbrellas, bags, backpacks, etc.

As seen in FIG. 1, cap 10 is a conventional baseball-style cap having a dome-shaped crown 12 intended to be removably receivable over and worn on a wearer's head. The crown 12 has a front portion, a rear portion, an inside surface 18, an outside surface, and a lower edge 11 defining a lower opening therebetween for the head of the wearer. The front portion of crown 12 is connected to a brim or bill 14, which extends outwardly from lower edge 11 of the front portion of crown 12.

As also seen in FIG. 1, crown 12 is constructed from a plurality of fabric panels 16, here four (4) panels 16a, 16b, 16c, and 16d which are sewn together to collectively form crown 12. However, it can be appreciated that the number of panels 16 and the exact construction of cap 10 and the method of attachment of panels 16 together may vary. Furthermore, the colors of the various components of cap 10 can vary. Panels 16a-16d each have an inner surface and an opposite outer surface. The inner surfaces of panels 16a-16d collectively form the inside surface 18 of crown 12 and the outer, exposed surfaces of panels 16a-16d collectively form the outside surface of crown 12.

As seen best in FIGS. 1-3, fabric panel 16a includes a non-embroidered, ornamental image 30 formed on its outer exposed surface, here in the form of a plurality of stars 22a, 22b, 22c, 22d, and 32 set against a background 34. Particularly, in the embodiment shown in FIGS. 1-3, ornamental image 30 which is printed onto panel 16a includes a plurality of small-sized stars 32, medium-sized stars 22a, 22b, 22c, and a large-sized star 22d, all of which are set against a background 34. It can be appreciated that ornamental image 30 comprising stars 32, 22a, 22b, 22c, and 22d, and background 34 may be any variety of colors, as desired.

While ornamental image 30 has been formed on panel 16a, it can also be appreciated that the ornamental image 30 can be formed in other locations on headwear 10, such as on any of panels 16a, 16b, 16c, and/or 16d, and/or bill 14. In the preferred embodiment, ornamental image 30 is printed onto fabric panel 16a, and more particularly, ornamental image 30 is preferably printed using a dye sublimation process prior to forming the raised, three-dimensional decorative image 20. The manners of printing onto fabric panel 16a would be well known to those having ordinary skill in the art. The design and colors of ornamental image 30 may vary and can assume any variety of designs, characters, cartoon images, lettering, text, logos, shapes, slogans, images, scenes, photographs, etc. or a vignette of images and/or text, or other desired images.

As also seen in FIGS. 1-3, at least a portion of fabric panel 16a bearing ornamental image 30 is embossed in relief, to define raised, three-dimensional decorative image 20 overlying a portion of ornamental image 30. More particularly, as seen in FIG. 2, the raised, three-dimensional decorative image 20 is an embossed portion of fabric panel 16a, where the outer surface of panel 16a has a raised profile and contour which is disposed above a remaining portion of the outer surface of fabric panel 16a. As a result, raised, three-dimensional decorative image 20 defines a three-dimensional effect to at least a portion of ornamental image 30 on fabric panel 16a. Here, raised, three-dimensional decorative image 20 creates a three-dimensional effect to stars 22a, 22b, 22c, and 22d and increases the visibility of ornamental image 30.

Although the raised, three-dimensional decorative image 20 is formed in relief on crown 12 of cap 10, and particularly, on the front panel 16a of crown 12, it can be appreciated that the raised, three-dimensional decorative image 20 may be formed in other locations on cap 10, such as on the sides or back of cap 10, and a single raised, three-dimensional decorative image 20 may be provided or the raised, three-dimensional decorative image 20 may comprise a plurality of spaced-apart images, such as seen in FIGS. 1 and 3.

Furthermore, the raised, three-dimensional decorative image 20 may assume any variety of desired designs, shapes, and configurations and have different sculptured profiles and contours depending on the desired shape of the raised, three-dimensional decorative image 20 and the three-dimensional effect desired of ornamental image 30. Particularly, in the embodiment shown in FIGS. 1-3, the raised, three-dimensional decorative image 20 is in the shape of a plurality of stars 22a, 22b, 22c, and 22d. Particularly, as seen best in FIGS. 2-3, raised, three-dimensional decorative image 20 is formed in relief on panel 16a and has a raised upper profile 24 on one side of the cap 10, in this embodiment, on the outside of the cap 10. On the opposite inner side of panel 16a which is disposed on the inside 18 of the cap 10, as seen in FIG. 3, decorative image 20 is indented. Therefore, both the inside and outside surface of panel 16a are embossed and raised upwardly.

As seen in FIGS. 1-3, the raised, three-dimensional decorative image 20 is precisely in alignment with and directly superimposed over at least a portion of ornamental image 30, to define a three-dimensional sculptured effect in relief, to a desired portion of ornamental image 30 on fabric panel 16a. More particularly, as seen in FIGS. 1-3, raised, three-dimensional decorative image 20 is in the shape of a plurality of stars and the outline, contour, and profile of the star-shaped raised, three-dimensional decorative image 20 is in alignment with and superimposed over stars 22a, 22b, 22c, and 22d of ornamental image 30 printed on the cap 10. As a result, the raised, three-dimensional decorative image 20 corresponds to and simulates the appearance of a portion of ornamental image 30 printed onto cap 10. Here, stars 22a, 22b, 22c, and 22d project outwardly from the remaining portion of fabric panel 16a to make them more conspicuous and visually interesting. In other words, the raised, three-dimensional decorative image 20 corresponds to and simulates the shape and design, of at least a portion of ornamental image 30, here the shape of stars 22a, 22b, 22c, and 22d.

Furthermore, as seen best in FIGS. 1-2, raised, three-dimensional decorative image 20 has an upper profile 24 which corresponds to and simulates the appearance of at least a portion of the design of ornamental image 30. Additionally, upper profile 24 may have varying heights as compared to the remaining non-raised portion of cap 10. This varying-height upper profile 24 creates a three-dimensional raised sculptural shape of decorative image 20, and creates a more realistic three-dimensional image, as the height of upper profile 24 corresponds to the ornamental image 30 printed on cap 10.

Figure 7:
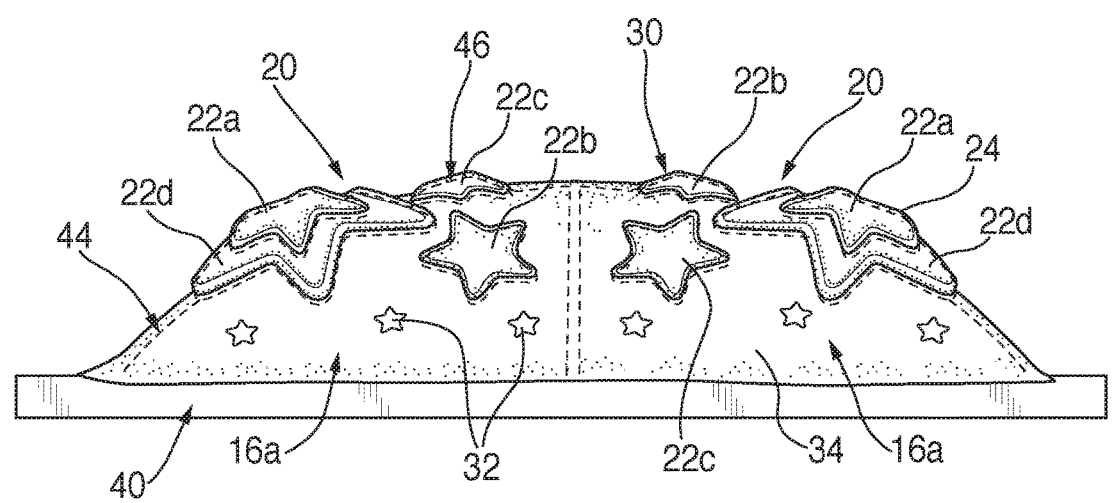
FIG. 7 is a front elevation view of the first mold after being separated from the second mold and with the raised, three-dimensional decorative image formed in the fabric panel.

Particularly, as seen in FIGS. 2 and 7, star 22a has an upper profile 24 with a height which is greater than the height of upper profiles 24 of stars 22b, 22c, and 22d. As a result, star 22a projects outwardly to a greater degree than stars 22b, 22c, and 22d to create a more complex and visually interesting raised, three-dimensional image 20 and one which simulates the appearance of the ornamental image 30 printed thereon. While it has been shown that raised, three-dimensional decorative image 20 has varying heights along its upper profile 24, it can be appreciated that raised, three-dimensional decorative image 20 may have a uniform height above the remaining non-raised surface of panel 16a.

Figure 4:
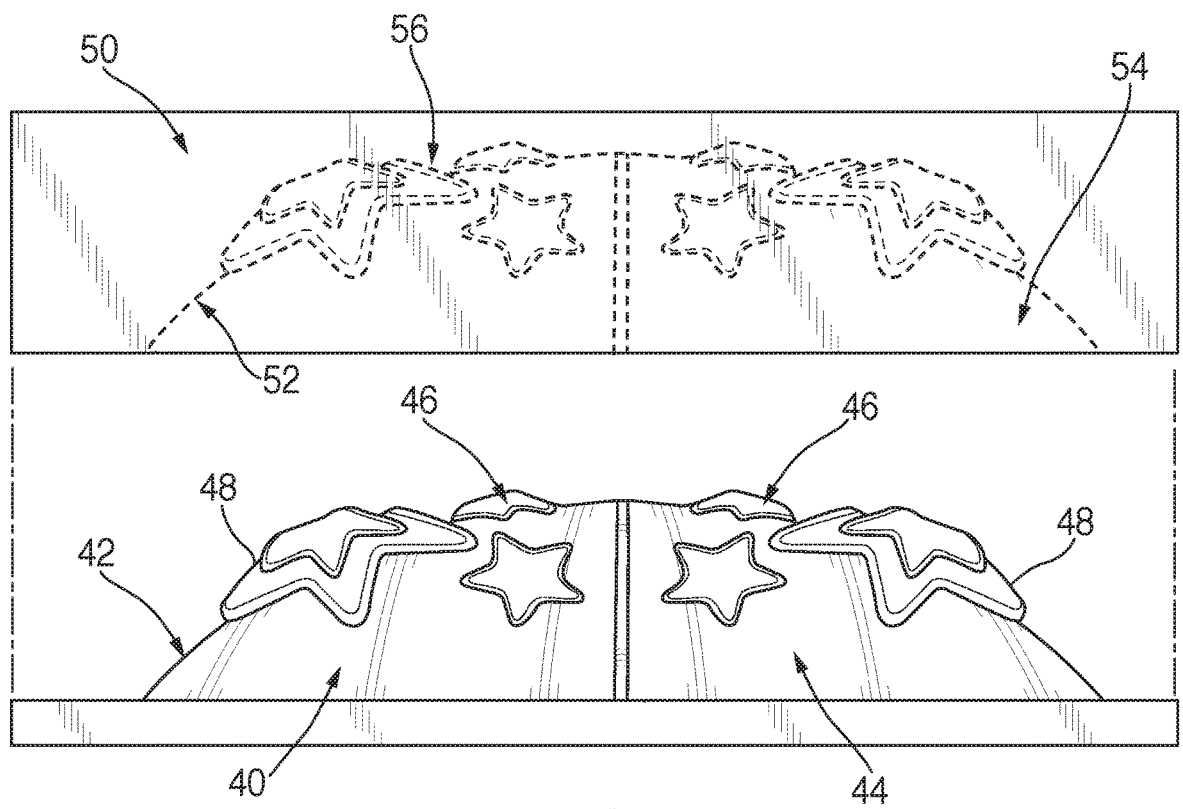
FIG. 4 is a front elevation view of the first and second molds for forming the raised, three-dimensional decorative image, according to the present invention.

The present invention also encompasses a method of forming the raised, three-dimensional decorative image 20 in relief on a fabric product, here, an article of headwear, namely, cap 10. Particularly, as seen in FIG. 4, a first mold or die 40 is provided. As seen in FIG. 4, mold 40 is sculptured and has a first surface, here the upper surface, generally designated by reference numeral 42. Upper surface 42 includes a base surface portion 44 and a raised surface portion 46. As seen best in FIG. 4, raised surface portion 46 is connected to and extends above base surface portion 44. In the preferred embodiment, mold 40 is metal. However, other suitable materials may be utilized.

As also seen in FIG. 4, raised surface portion 46 of mold 40 is sculptured in relief and has a shape, contour, and an upper profile 48 which corresponds to the shape and design of the raised, three-dimensional decorative image 20 to be embossed in relief onto a fabric, here panels 16a of cap 10. Particularly, the shape of raised surface portion 46 of mold 40 is the same as the shape of raised, three-dimensional decorative image 20. Furthermore, the contour of the upper profile 48 of raised surface portion 46 is the same as the contour of the upper profile 24 of raised, three-dimensional decorative image 20. As seen in FIG. 4, mold 40 has two raised surface portions 46 which are mirror images of one another, so that two raised, three-dimensional decorative images 20 can be formed at the same time on two panels 16a which are connected together, to be later cut apart and incorporated into two separate caps 10. However, it can be appreciated that mold 40 may include only one raised surface portion 46 or a plurality of raised surface portions 46. When a plurality of raised surface portions 46 are provided, like in FIG. 4, panels 16a must be cut apart before incorporation into cap 10.

Figure 6:
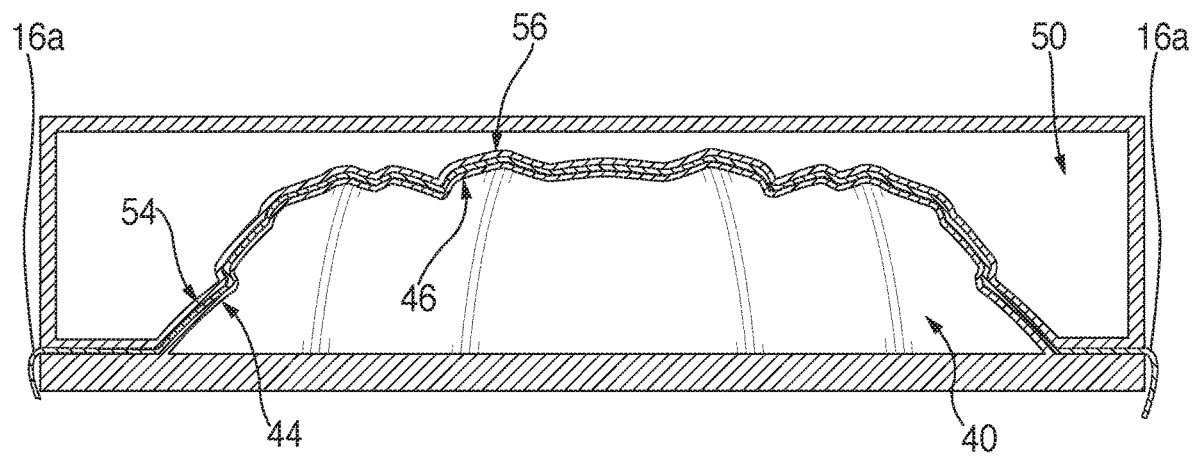
FIG. 6 is a cross-sectional view of the first and second molds pressed together, with the fabric panel disposed therebetween.

In addition, a second mold 50 is provided. In a preferred embodiment, mold 50 is metal. However, like mold 40, other suitable materials may be utilized. In one embodiment, second mold 50 has a shape that corresponds to the shape of first mold 40, such that first mold 40 and second mold 50 fit together when brought into contact, as seen in FIG. 6. Particularly, as seen best in FIG. 4, mold 50 has a first, lower surface 52 having a base surface portion 54 with a shape that corresponds to the shape of base surface portion 44 of first mold 40 and an indented surface portion 56 having a shape that corresponds to the shape of raised surface portion 46 of mold 40. As a result, upper surface 42 of mold 40 is aligned with lower surface 52 of mold 50, such that base surface portion 44 is aligned with base surface portion 54 and raised surface portion 46 is aligned with indented surface portion 56, so that when molds 40 and 50 are brought together, as in FIG. 6, raised surface portion 46 of first mold half 40 is received within indented surface portion 56 of second mold half 50.

Alternatively, second mold half 50 may have a soft surface that first mold 40 is brought into contact with. It can be appreciated that the shape of mold 50 may vary, so long as first mold 40 is capable of forming raised, three-dimensional decorative image 20 in panel 16a.

Figure 5:
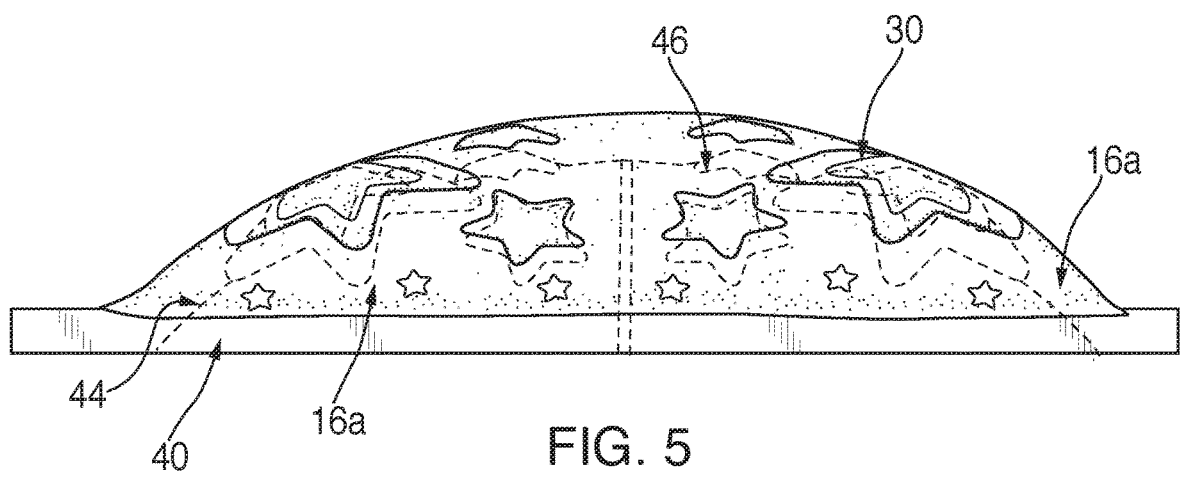
FIG. 5 is a front elevation view of the fabric panel to be embossed with the raised, three-dimensional decorative image positioned over the first mold.

In the next step as set forth in FIG. 5, a piece of fabric having non-embroidered, ornamental image 30 formed thereon is provided. Here, two attached panels 16a of cap 10 each imprinted with ornamental images 30 are provided. Particularly, as seen in FIG. 5, two panels 16a which are mirror images of one another and are connected together in a mirror image manner, are provided. Although the method is described in connection with panel 16a of cap 10, any suitable fabric in which it is desired to emboss the fabric with the raised, three-dimensional decorative image 20, may be utilized. The type of fabric and the thickness of the fabric may vary so long as the fabric is one which is capable of being embossed and retaining the shape of the raised, three-dimensional decorative image 20 formed therein once removed from molds 40 and 50.

Figure 8:
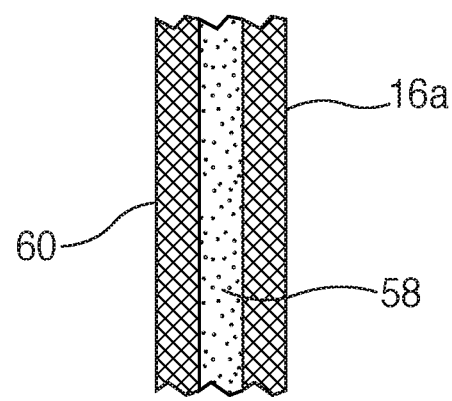
FIG. 8 is a cross sectional view of a three-ply fabric panel embodying the present invention to be embossed with the raised, three-dimensional decorative image, highlighting inclusion of a fabric lining and foam backing.

Furthermore, it is preferred that fabric panel 16a is imprinted with ornamental image 30, prior to placing fabric panel 16a between molds 40 and 50. In the preferred embodiment, ornamental image 30 is applied to fabric panel 16a via dye sublimation, prior to placing fabric panel 16a between molds 40 and 50. In the preferred embodiment, a sublimated knit polyester fabric having a foam backing 58 (FIG. 8) is utilized. In another embodiment, an acrylic fabric is utilized. Furthermore, the fabric may be a single layer or multiple layers including, for example, a three-ply fabric panel comprising an outer ply-namely fabric panel 16a, fusing or foam ply 58 and a lining and backing ply or layer 60, which may be a cotton twill fabric. In another embodiment, a micro fiber fabric material is utilized for panel 16a of cap 10. However, the fabric utilized may vary so long as it is capable of retaining raised, three-dimensional decorative image 20 therein. In a preferred embodiment, fabric panel 16a is a non-pile or non-flocked fabric.

Next, as seen in FIG. 5, the fabric material, here panels 16a are positioned over first mold 40, and beneath second mold 50. In the preferred embodiment, the fabric panel 16a is sublimated or printed with ornamental image 30, prior to positioning it over first mold 40. Although the present method describes and illustrates mold 40 as being the bottom mold and that panel 16a is placed over mold 40, it can be appreciated that the positions of first mold 40 and second mold 50 can be reversed and panel 16a may be placed over second mold 50.

As shown in FIG. 5, when positioning panel 16a over first mold 40, the portion of ornamental image 30 which is to be embossed with the raised, three-dimensional decorative image 20 is placed directly above and precisely in alignment with the corresponding portion of raised surface portion 46 of mold 40, so that the portion of panel 16a which is aligned with raised surface portion 46 is embossed to define a three-dimensional sculptured effect in relief, to the aligned portion of ornamental image 30 on fabric panel 16a. Since the method according to the present invention does not utilize a roller for embossing the fabric, the present method is particularly suitable for embossing a precise portion of panel 16a aligned with ornamental image 30, rather than embossing a repetitive pattern onto panel 16a.

In the next step, as seen in FIG. 6, first mold 40 and second mold 50 are pressed together with fabric layer 16a disposed in between. As a result, the portion of panel 16a which is disposed above raised surface portion 46 of mold 40 is pressed upwardly into indented surface portion 56 of mold 50 to create the raised, three-dimensional decorative image 20 in panel 16a, on the corresponding portion of ornamental image 30. Molds 40 and 50 are pressed together in such a manner and for a sufficient length of time and with a sufficient pressure, so that raised, three-dimensional decorative image 20 is retained in panel 16a, once molds 40 and 50 are separated and panel 16a is removed. In one embodiment, heat is applied to panel 16a while molds 40 and 50 are pressed together, so that panel 16a maintains its deformed and embossed shape, once removed from molds 40 and 50. Alternatively, sufficient pressure may be applied to panel 16a by molds 40 and 50, so that panel 16a maintains its deformed shape, once removed from molds 40 and 50. However, it can be appreciated that other methods may be utilized to form or emboss raised, three-dimensional decorative image 20 in a fabric.

Next, as seen in FIG. 7, molds 40 and 50 are separated from each other. As a result, raised three-dimensional decorative image 20 is embossed or formed in relief in fabric panel 16a and in such a manner that the shape and contour of decorative image 20 is retained in panel 16a, when removed from molds 40 and 50. Panel 16a is then removed from molds 40 and 50 and incorporated into a fabric product, here cap 10 shown in FIGS. 1-3. Particularly, panel 16a may be cut and sewn according to conventional hat making methods to create cap 10. As mentioned previously, the embossed fabric panel formed as a result of the present invention can be utilized in connection with other fabric products including other items of clothing or accessories or other styles of hats and the methods for incorporating a fabric with the raised, three-dimensional decorative image 20 into a final product would be well known to those having ordinary skill in the art. Additionally, panel 16*a* may be further processed such as by adding other ornamentation thereto such as, for example, glitter or rhinestones, etc., as desired.

While particular embodiments of the invention have been described, it is not intended that the invention be limited thereto, as it is intended that the invention be as broad in scope as the prior art will allow and that the specification be read likewise. It will therefore be appreciated by those skilled in the art that other modifications could be made thereto without departing from the spirit and scope of the invention.

What is claimed is:

1. An article of headwear having an image printed directly thereon and embossed in relief to define a raised, three-dimensional decorative ornamental image comprising:
    an article of headwear comprising a dome-shaped crown which is configured and dimensioned to be removably receivable directly upon the head of a wearer, said crown having an outer surface, an inner surface and a bottom arcuate edge defining a lower opening projecting into said dome-shaped crown;
    wherein a portion of said crown comprises at least one fabric panel which has an outer surface, an inner surface and a bottom arcuate edge coincident with said outer surface, said inner surface and said bottom arcuate edge of said crown, respectively;
    wherein said at least one fabric panel and, in turn, said portion of said crown has a, non-embroidered, decorative ornamental image imprinted directly on said outer surface of said fabric panel via dye sublimation so as to be coincident therewith, the resulting dye sublimated, non-embroidered, decorative ornamental image comprising a plurality of colors;
    wherein a portion of said fabric panel and, in turn, said non-embroidered, decorative, ornamental image is embossed in relief to define an outwardly-extending, convexly-shaped, embossed portion of said fabric panel and, in turn, of said decorative non-embroidered, ornamental image;
    wherein another portion of said fabric panel and, in turn, said non-embroidered decorative, ornamental image is non-embossed to define a relatively flat, non-embossed portion of said fabric panel and, in turn, said non-embroidered, decorative, ornamental image;
    wherein said embossed portion of said fabric panel and, in turn, said non-embroidered, decorative, ornamental image has a convexly-shaped, raised profile and contour disposed above said relatively flat, non-embossed portion of said fabric panel and, in turn, of said non-embroidered decorative ornamental image, that varies in height with respect to said fabric panel and, in turn, said relatively flat, non-embossed portion of said non-embroidered, decorative, ornamental image to thereby create a three-dimensional effect to said dye-sublimated, non-embroidered, decorative ornamental image coincident with said outer surface of said fabric panel and, in turn, a portion of said crown of said article of headwear;
    wherein said article of headwear comprises a baseball cap style hat including said dome-shaped crown, and a bill attached to, and extending outwardly from, said bottom arcuate edge of a front portion of said crown, and wherein said fabric panel is incorporated into at least said front portion of said crown of said cap;
    wherein said embossed portion of said non-embroidered decorative ornamental image comprises a plurality of embossed portions and said plurality of embossed portions of said non-embroidered, decorative ornamental image is in alignment with at least a portion of said decorative ornamental image on said outer surface of said fabric panel to create a three-dimensional sculptured effect in relief, relative to said non-embroidered, decorative ornamental image on said fabric panel;
    wherein said fabric panel is made of a synthetic fabric selected from the group consisting of a knit polyester fabric, an acrylic fabric and a microfiber fabric; and
    wherein said fabric panel additionally includes a fabric lining and a foam backing, with said foam backing being disposed between said fabric panel and said fabric lining.

2. The headwear according to claim 1, wherein:
said non-embroidered, decorative ornamental image is a member selected from the group consisting of designs, characters, cartoon images, lettering, text, logos, shapes, slogans, images, scenes, photographs, vignettes and a combination thereof.

3. The headwear according to claim 1, wherein:
said embossed portions of said non-embroidered, decorative ornamental image comprises a plurality of spaced-apart embossed portions.

* * * * *